(12) United States Patent
Hayano et al.

(10) Patent No.: US 10,199,683 B2
(45) Date of Patent: Feb. 5, 2019

(54) POLYETHER COPOLYMER, CROSSLINKABLE POLYETHER COPOLYMER COMPOSITION AND ELECTROLYTE

(71) Applicant: ZEON CORPORATION, Tokyo (JP)

(72) Inventors: Shigetaka Hayano, Kanagawa (JP); Hiroyuki Nitadori, Tokyo (JP)

(73) Assignee: ZEON CORPORATION, Tokyo (JP)

( * ) Notice: Subject to any disclaimer, the term of this patent is extended or adjusted under 35 U.S.C. 154(b) by 88 days.

(21) Appl. No.: 14/430,470

(22) PCT Filed: Sep. 26, 2013

(86) PCT No.: PCT/JP2013/076012
§ 371 (c)(1),
(2) Date: Mar. 23, 2015

(87) PCT Pub. No.: WO2014/050944
PCT Pub. Date: Apr. 3, 2014

(65) Prior Publication Data
US 2015/0270572 A1    Sep. 24, 2015

(30) Foreign Application Priority Data

Sep. 28, 2012    (JP) ................... 2012-216737

(51) Int. Cl.
| | |
|---|---|
| H01M 10/056 | (2010.01) |
| H01M 10/0565 | (2010.01) |
| C08G 65/333 | (2006.01) |
| H01B 1/12 | (2006.01) |
| H01M 2/16 | (2006.01) |
| H01M 8/1025 | (2016.01) |
| H01M 10/0525 | (2010.01) |
| C08G 59/14 | (2006.01) |
| C08G 65/14 | (2006.01) |
| C08G 65/24 | (2006.01) |

(52) U.S. Cl.
CPC .... *H01M 10/0565* (2013.01); *C08G 59/1477* (2013.01); *C08G 65/14* (2013.01); *C08G 65/24* (2013.01); *C08G 65/333* (2013.01); *C08G 65/33306* (2013.01); *H01B 1/122* (2013.01); *H01M 2/1653* (2013.01); *H01M 8/1025* (2013.01); *H01M 10/0525* (2013.01); *H01M 2300/0082* (2013.01)

(58) Field of Classification Search
None
See application file for complete search history.

(56) References Cited

U.S. PATENT DOCUMENTS

| | | | |
|---|---|---|---|
| 4,199,562 A | 4/1980 | Vanlerberghe et al. | |
| 4,491,534 A | 1/1985 | Vanlerberghe et al. | |
| 4,620,037 A | 10/1986 | Vanlerberghe et al. | |
| 2006/0076051 A1 | 4/2006 | Watanabe et al. | |
| 2009/0176161 A1 | 7/2009 | Sanchez et al. | |
| 2012/0296049 A1 | 11/2012 | Yonemaru et al. | |
| 2013/0214209 A1* | 8/2013 | Hayano .............. | G03G 15/0233 252/500 |

FOREIGN PATENT DOCUMENTS

| | | |
|---|---|---|
| EP | 1 230 934 A1 | 8/2002 |
| JP | S53-11999 A | 2/1978 |
| JP | 2001-146556 A | 5/2001 |
| JP | 2001-256828 A | 9/2001 |
| JP | 2002-246066 A | 8/2002 |
| JP | 2008-530331 A | 8/2008 |
| JP | 2012-033367 A | 2/2012 |
| WO | 2004/112184 A1 | 12/2004 |
| WO | 2006/087449 A1 | 8/2006 |
| WO | 2011/081152 A1 | 7/2011 |
| WO | 2012/057299 A1 | 5/2012 |

OTHER PUBLICATIONS

Jan. 7, 2014 International Preliminary Report on Patentability issued in Application No. PCT/JP2013/076012.

* cited by examiner

*Primary Examiner* — Wyatt P McConnell
(74) *Attorney, Agent, or Firm* — Oliff PLC

(57) ABSTRACT

Provided is a material which exhibits excellent ion conductivity and excellent processability and which can provide an electrolyte that exhibits excellent water-resistant shape retention properties after processing. A polyether copolymer having polyether segment blocks having cationic groups and hydrophobic polyether segment blocks. The polyether segments having cationic groups preferably have oxirane monomer units represented by general formula (1). The polyether copolymer may have oxirane monomer units having crosslinkable groups. An electrolyte is obtained by crosslinking a composition containing the polyether copolymer and a crosslinking agent. (In general formula (1), A+ denotes a group having an onium cation structure having a cationic nitrogen atom, and X− denotes an anion).

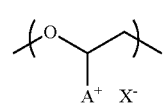

(1)

10 Claims, No Drawings

POLYETHER COPOLYMER, CROSSLINKABLE POLYETHER COPOLYMER COMPOSITION AND ELECTROLYTE

TECHNICAL FIELD

The present invention relates to a polyether copolymer, and a crosslinkable polyether copolymer composition and a composite each comprising the same, as well as an electrolyte produced by crosslinking the crosslinkable polyether copolymer composition. More particularly, the invention relates to a polyether copolymer which comprises a polyether segment block containing a cationic group and a hydrophobic polyether segment block and which exhibits superior processability, and relates to a crosslinkable polyether copolymer composition and a composite each comprising the polyether copolymer, as well as an electrolyte superior in waterproof shape-retaining properties and ion conductivity which is obtained by crosslinking the crosslinkable polyether copolymer composition.

BACKGROUND ART

Liquid electrolytes obtained by dissolving an electrolyte salt in a solvent have been used heretofore to provide ion conductivity between electrodes in electrochemical devices such as secondary cells, fuel cells, dye-sensitized solar cells and actuators. However, liquid electrolytes comprising a solvent involve a risk of reduction in the liquid volume with time because of volatilization of the solvent, or a risk of liquid leakage. Therefore, development of alternatives to such electrolytes has been studied.

As for electrolytes alternative to liquid electrolytes comprising a solvent, use of nonvolatile ionic liquids has been studied. For example, an electrolyte composition comprising an imidazolium or pyridinium compound substituted with an oligoether group has been proposed in Patent Document 1. Use of such an ionic liquid as an electrolyte ameliorates the problem of reduction in the liquid volume with time because of volatilization of the solvent and the problem of liquid leakage which are observed in liquid electrolytes comprising solvents. However, since this technology still uses a liquid as an electrolyte, it cannot completely solve a problem of complicated manipulations in the production of electrochemical devices and liquid leakage during use of the devices.

Therefore, use of a polymer material having superior ion conductivity as an electrolyte (so-called a polymer electrolyte) has been studied. For example, use for an electrolyte composition of a polyether compound comprising a polyalkylene oxide main chain, an ionic side chain and a counter ion for the ionic side chain, in which the ionic side chain or the counter ion exhibits liquid crystal properties, has been proposed in Patent Document 2. Furthermore, a solid electrolyte composition comprising a polymer compound which has a cation structure in the main chain or side chains and which has a halide or polyhalide ion as a counter anion for the cation structure has been proposed in Patent Document 3.

Since these electrolyte compositions are solid and hardly exhibit fluidity under ordinary use environments of electrolytes, the problem of leakage of the liquid during use of electrochemical devices is solved.

However, there was a problem that, because the electrolyte compositions described in Patent Documents 2 and 3 are solid, they are inflexible in being applied to electrochemical devices as electrolytes and they are hard, for example, to coat on or impregnate into other materials. Meanwhile, there was another problem that, since these electrolyte compositions have random structures, they were easily affected by media such as organic solvents or water.

Therefore, there has strongly been sought a material which can provide electrolytes having superior processability enough to be coated on or impregnated into other materials, also having resistance to organic solvents, water, etc., and exhibiting, after being processed, superior shape-retaining properties enough to be prevented from liquid leakage, swelling, elution, etc.

PRIOR ART DOCUMENTS

Patent Documents

Patent Document 1: JP-A-2001-256828
Patent Document 2: JP-A-2002-246066
Patent Document 3: WO 2004/112184

SUMMARY OF THE INVENTION

Problems that the Invention is to Solve

Accordingly, an object of the invention is to provide a material which can provide an electrolyte being superior in ion conductivity, water resistance and processability and further exhibiting superior waterproof shape-retaining properties after being processed.

Means for Solving the Problems

The present inventors carried out intensive studies in order to achieve the above-described object and have found that a composition obtained by combining a crosslinking agent with a polyether copolymer, which is obtained through introduction of a crosslinkable group to a polyether copolymer comprising a polyether segment block containing a cationic group and a hydrophobic polyether segment block, has superior processability enough to be coated on or impregnated into other materials, and have found that the composition can provide, upon being crosslinked after processed, an electrolyte exhibiting improved shape-retaining properties while maintaining superior ion conductivity of the above polyether copolymer. The invention has been completed based on these findings.

Thus, according to the invention, there is provided a polyether copolymer comprising a polyether segment block containing a cationic group and a hydrophobic polyether segment block.

In the polyether copolymer of the invention, the polyether segment block containing a cationic group preferably contains an oxirane monomer unit represented by

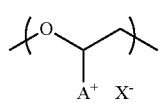

(1)

wherein $A^+$ is a cationic group which has an onium cation structure containing a nitrogen atom, and $X^-$ is an anion.

In the polyether copolymer of the invention, the cationic group which has an onium cation structure containing a nitrogen atom is preferably a group which has an onium salt structure containing an atom of Group 15 or 16 in the periodic table.

In the polyether copolymer of the invention, the cationic group which has an onium cation structure containing a nitrogen atom is preferably a group having a structure in which a nitrogen atom in a nitrogen atom-containing aromatic heterocyclic ring forms an onium salt.

Preferably, the polyether copolymer of the invention further has an oxirane monomer unit bearing a crosslinkable group.

In the polyether copolymer of the invention, the oxirane monomer unit bearing a crosslinkable group is preferably contained in the hydrophobic polyether segment block.

In the polyether copolymer of the invention, the oxirane monomer unit bearing a crosslinkable group is preferably selected from among an allyl glycidyl ether monomer unit, a glycidyl acrylate monomer unit and a glycidyl methacrylate monomer unit.

Moreover, according to the invention, there is provided a crosslinkable polyether copolymer composition comprising the above-described polyether copolymer of the invention and a crosslinking agent for the crosslinkable group in the polyether copolymer.

Furthermore, according to the invention, there is provided a composite comprising the above-described polyether copolymer of the invention and a porous support.

The composite can be an electrolyte film.

Furthermore, according to the invention, there is provided an electrolyte produced by crosslinking the above-described crosslinkable polyether copolymer composition of the invention.

ADVANTAGE OF THE INVENTION

According to the invention, a polyether copolymer superior in ion conductivity and water resistance as well as superior in processability can be obtained, and an electrolyte having superior waterproof shape-retaining properties can be obtained from the copolymer.

MODE FOR CARRYING OUT THE INVENTION

The polyether copolymer of the invention comprises a polyether segment block containing a cationic group and a hydrophobic polyether segment block. That is, the polyether copolymer of the invention is comprised of a repeating unit having a polyether structure which is obtained through ring-opening polymerization of a compound having an oxirane structure, and has a polyether segment block containing a cationic group and a hydrophobic polyether segment block.

The polyether segment block containing a cationic group comprises a cationic group-bearing, polyether-structured repeating unit (which may hereinafter be referred to simply as "cationic group-bearing repeating unit(s)") which is a repeating unit derived through ring opening of an oxirane ring of an oxirane monomer (which may hereinafter be referred to as "oxirane monomer unit(s)") and bears a cationic group.

The polyether segment block containing a cationic group may be comprised of only a cationic group-bearing repeating unit, or may have a repeating unit other than the cationic group-bearing repeating unit.

In the polyether copolymer of the invention, the proportion of the cationic group-bearing repeating units to total oxirane monomer units constituting the polyether copolymer is not particularly limited. However, in general, the proportion of the cationic group-bearing repeating units is 1 mol % to 95 mol %, preferably 5 mol % to 70 mol %. When this proportion is too small, the resultant polyether copolymer is likely to exhibit inferior ion conductivity.

The proportion of the cationic group-bearing repeating units in the polyether segment block containing a cationic group is preferably 30 mol % to 100 mol %, more preferably 50 mol % to 100 mol %. When this proportion is too small, the resultant polyether copolymer is likely to exhibit inferior ion conductivity.

The cationic group-bearing repeating unit is not particularly limited as long as it is a repeating unit which is derived by ring opening of an oxirane ring of an oxirane monomer and bears a cationic group. The cationic group-bearing repeating unit can be expressed by the following general formula (1).

wherein $A^+$ is a cationic group and $X^-$ is a counter anion.

The above-mentioned cationic group is not particularly limited as long as it is a group having cationic properties. However, the cationic group is preferably a cationic group which has an onium salt structure containing an atom of Group 15 or 16 in the periodic table. In particular, the cationic group is preferably a cationic group having a structure of an onium cation salt containing a nitrogen atom.

Specific examples of the cationic group which has a structure of an onium cation salt containing a nitrogen atom include ammonium groups (e.g. an ammonium group, methylammonium group, butylammonium group, cyclohexylammonium group, anilinium group, benzylammonium group, ethanolammonium group, dimethylammonium group, diethylammonium group, dibutylammonium group, nonylphenylammonium group, piperidinium group, trimethylammonium group, triethylammonium group, n-butyldimethylammonium group, n-octyldimethylammonium group, n-stearyldimethylammonium group, tributylammonium group, trivinylammonium group, triethanolammonium group, N,N'-dimethylethanolammonium group, tri(2-ethoxyethyl)ammonium group, 1-methylpyrrolidinium group, aziridinium group, 1-methylaziridinium group, and 1-azonia-4-azabicyclo[2.2.2]octane group); and groups having a structure in which a nitrogen atom in a nitrogen atom-containing aromatic heterocyclic ring forms an onium salt (e.g. an imidazolium group, 1-methylimidazolium group, 1-ethylimidazolium group, benzimidazolium group, pyrrolium group, 1-methylpyrrolium group, oxazolium group, benzoxazolium group, benzisoxazolium group, pyrazolium group, isoxazolium group, pyridinium group, 2,6-dimethylpyridinium group, pyrazinium group, pyrimidinium group, pyridazinium group, triazinium group, N,N'-dimethylanilinium group, quinolinium group, isoquinolinium group, indolium group, quinoxalium group, isoindolium group, thiazolium group, and acridinium group). Among them, groups having a structure in which a nitrogen atom in a nitrogen atom-containing aromatic heterocyclic ring forms an onium salt are more preferable.

The counter anion for the cationic group is not particularly limited, and there can be mentioned, for example, halide ions such as $Cl^-$, $Br^-$ and $I^-$; $OH^-$; $SCN^-$; $BF_4^-$; $PF_6^-$;

$ClO_4^-$; sulfone imide anions such as $(FSO_2)_2N^-$, $(CF_3SO_2)_2N^-$ and $(CF_3CF_2SO_2)_2N^-$; sulfonate ions such as $CH_3SO_3^-$ and $CF_3SO_3^-$; and carboxylate ions such as $CF_3COO^-$, $PhCOO^-$, $CH_3COO^-$, $C_3H_7COO^-$; and the like.

The counter anion may consist of a single kind, or may be a mixture of plural kinds.

The repeating units other than the cationic group-bearing repeating units which may be contained in the polyether segment block containing a cationic group, may include, for example, alkylene oxide monomer units (e.g. propylene oxide monomer unit, 1,2-butylene oxide monomer unit, and 1,2-hexene oxide monomer unit); oxirane monomer units having an aliphatic ring structure (e.g. cyclohexene oxide monomer unit); aromatic oxirane monomer units (e.g. styrene oxide monomer unit); halogen-containing oxirane monomer units (e.g. epifluorohydrin monomer unit, trifluoromethyloxirane monomer unit, and epichlorohydrin monomer unit); glycidyl ether monomer units (e.g. phenyl glycidyl ether monomer unit, methoxyethoxy ethyl glycidyl ether monomer unit, and vinyl glycidyl ether monomer unit); and glycidyl ester monomer units (e.g. glycidyl methacrylate monomer unit, glycidyl acrylate monomer unit); and the like.

The hydrophobic polyether segment block constituting the polyether copolymer of the invention has a repeating unit ("oxirane monomer unit") which is derived by ring opening of an oxirane ring of an oxirane monomer and which is nonionic, and has hydrophobicity as a whole.

In the hydrophobic polyether segment block, the proportion of the nonionic oxirane monomer units is not particularly limited, but is preferably 80 mol % to 100 mol %, more preferably 90 mol % to 100 mol %. When the proportion is too small, waterproof shape-retaining properties may be impaired.

In the invention, the "hydrophobic polyether segment" means such a polyether segment that gives a sample consisting only of the polyether segment that retains, after kept to stand in water at 60° C. for 24 hours, its shape without being dissolved therein and changing its shape, even if the sample absorbed water to swell, and, gives no weight loss when the sample is taken out from water and is deprived of water by distillation.

Specific examples of the nonionic oxirane monomer units include, an alkylene oxide monomer unit (e.g. ethylene oxide monomer unit, propylene oxide monomer unit, 1,2-butylene oxide monomer unit, and 1,2-hexene oxide monomer unit); an oxirane monomer unit having an aliphatic ring structure (e.g. cyclohexene oxide monomer unit); an aromatic oxirane monomer unit (e.g. phenyl glycidyl ether monomer unit, and styrene oxide monomer unit); and a halogen-containing oxirane monomer unit (e.g. epifluorohydrin monomer unit, trifluoromethyloxirane monomer unit, epichlorohydrin monomer unit); and the like.

The hydrophobic polyether segment is preferably a polyether segment mainly composed of an alkylene oxide monomer unit having 3 or more carbons, a cycloalkylene oxide monomer unit or an aromatic oxirane monomer unit, and, optionally combined, an oxirane monomer unit bearing a crosslinkable group.

In the invention, the hydrophobic polyether segment block may have a cationic group-bearing repeating unit.

The proportion of the cationic group-bearing repeating units in the hydrophobic polyether segment block is preferably 20 mol % or less, more preferably 10 mol % or less. When the proportion is too large, the resultant polyether copolymer may be dissolved out in water, or may be inferior in waterproof shape-retaining properties.

The polyether copolymer of the invention may contain a nonionic oxirane monomer unit bearing a crosslinkable group.

The nonionic oxirane monomer unit bearing a crosslinkable group is a repeating unit ("oxirane monomer unit") derived by ring opening of an oxirane ring of an oxirane monomer, and is a nonionic oxirane monomer unit bearing a crosslinkable group.

In the polyether copolymer of the invention, the nonionic oxirane monomer unit bearing a crosslinkable group is preferably contained in the hydrophobic polyether segment block.

The crosslinkable group which can be contained in the oxirane monomer unit is not particularly limited as long as it is a group which can form an intramolecular or intermolecular crosslinked structure due to the effect of the crosslinking agent or heat, and includes, for example, an ethylenically unsaturated carbon-carbon bond-containing group such as a vinyl or allyl group.

As specific examples of the nonionic oxirane monomer units bearing a crosslinkable group, there can be mentioned an ethylenically unsaturated glycidyl ether monomer unit (e.g. glycidyl methacrylate monomer unit, glycidyl acrylate monomer unit, vinyl glycidyl ether monomer unit, and allyl glycidyl ether monomer unit); a diene or polyene monoepoxide monomer unit (e.g. butadiene monoepoxide monomer unit, and chloroprene monoepoxide monomer unit); an alkenyl epoxide monomer unit (e.g. 1,2-epoxy-5-hexene monomer unit); and the like.

Among them, from the viewpoint of ready synthesis of the polyether copolymer, an ethylenically unsaturated glycidyl ether monomer unit is preferably used, and, among ethylenically unsaturated glycidyl ether monomer units, a glycidyl methacrylate monomer unit, a glycidyl acrylate monomer unit, and an allyl glycidyl ether monomer unit are particularly preferably used.

The proportion of the nonionic oxirane monomer unit bearing a crosslinkable group to total monomer units in the polyether copolymer of the invention is preferably 1 mol % to 20 mol %, more preferably 5 mol % to 10 mol %. When the proportion falls within the range, an electrolyte having significantly enhanced waterproof shape-retaining properties can be provided without impairing the ion conductivity by crosslinking the polyether copolymer using a crosslinking agent together.

When the nonionic oxirane monomer unit bearing a crosslinkable group is introduced into the hydrophobic polyether segment block, the proportion of the oxirane monomer unit bearing a crosslinkable group in the hydrophobic polyether segment block is not particularly limited but is generally 1 mol % to 20 mol %, preferably 5 mol % to 10 mol %. When this proportion is too small, there may be difficulty in crosslinking the resultant polyether copolymer. On the other hand, when the proportion is too large, the resultant polyether copolymer may be inferior in ion conductivity.

In the polyether copolymer of the invention, the proportion of the nonionic oxirane monomer unit to total oxirane monomer units constituting the polyether copolymer is not particularly limited but is generally 1 mol % to 99 mol %, more preferably 5 mol % to 95 mol %, and particularly preferably 20 mol % to 90 mol %. When the proportion is too small, the resultant polyether copolymer may be inferior in hydrophobicity.

The hydrophobic polyether segment in the polyether copolymer of the invention is a polyether segment which is relatively non-polar compared to the polyether segment containing a cationic group and which does not exhibit solubility in water.

On the other hand, the polyether segment containing a cationic group in the polyether copolymer of the invention is highly polar, since a cationic group is present in the polyethersegment.

Therefore since, the polyether copolymer of the invention has low compatibility with the hydrophobic polyether segment, the polyether copolymer of the invention exhibits superior water resistance due to the hydrophobic polyether segment and superior ion conductivity due to the polyether segment containing a cationic group.

A terminal group of the polyether copolymer of the invention is not particularly limited, and can be any monovalent group. As specific examples of the terminal group, there can be mentioned a hydrogen atom, a halogen atom, an alkyl group, a haloalkyl group, a hydroxyl group, and a group represented by the general formula (2) below.

Among them, a terminal group of the polyether segment containing a cationic group in the polyether copolymer of the invention is preferably a group represented by general formula (2).

$-A^+X^-$                            (2)

$A^+$ is a cationic group which has an onium cation structure containing a nitrogen atom, and $X^-$ is an anion. As specific examples of the cationic group, represented by $A^+$ of general formula (2), which has an onium cation structure containing a nitrogen atom, there can be mentioned above-described onium cations represented by general formula (1), and a plurality of $A^+$ terminal units represented by general formula (2) may be contained as a terminal group. $X^-$ refers to a counter anion of the onium structure, and, specific examples thereof include those described above as a counter anion for a cationic group represented by general formula (1). All anions represented by $X^-$ may be the same kind of an anion, or may be a mixture of different kinds of anions in the repeating units represented by general formula (1) in the polyether copolymer.

The number-average molecular weight of the polyether copolymer of the invention is not particularly limited but is preferably 500 to 1,000,000, more preferably 1,000 to 500,000, and particularly preferably 1,000 to 100,000. When the number-average molecular weight is too small, the strength may be insufficient. On the other hand, when the number-average molecular weight is too large, the polyether copolymer may be inferior in ion conductivity.

Also, the molecular weight distribution, namely, a ratio of the weight-average molecular weight to the number-average molecular weight, of the polyether copolymer of the invention is not particularly limited, but is preferably 1.0 to 4.0, more preferably 1.0 to 2.0.

In addition, in the polyether copolymer of the invention, the ratio of the molecular weight of the polyether segment block containing a cationic group to the molecular weight of the hydrophobic polyether segment block is not particularly limited. However, the ratio of (the number-average molecular weight of the polyether segment block containing a cationic group): (the number-average molecular weight of the hydrophobic polyether segment block) is preferably within a range of 2:1 to 1:10, more preferably within a range of 1:1 to 1:5. When this ratio is too large, the polyether copolymer may be inferior in waterproof shape-retaining properties. On the other hand, when the ratio is too small, the polyether copolymer may be inferior in ion conductivity.

A method for synthesizing the polyether copolymer of the invention is not particularly limited, and any synthesis method can be adopted as long as it can provide the target polyether copolymer. From the viewpoint of obtaining the target polyether copolymer more easily, favorable is a method, in which a nitrogen-containing compound is reacted with a polyether copolymer which comprises a polyether segment containing an epichlorohydrin monomer unit (repeating unit derived by ring opening of the oxirane ring of epichlorohydrin) and a hydrophobic polyether segment not containing an epichlorohydrin monomer unit, to thereby convert the epichlorohydrin monomer unit to an oxirane monomer unit having an onium chloride structure, and thus, a polyether segment containing an epichlorohydrin monomer unit is converted to a polyether segment containing a cationic group, thereby giving the target polyether copolymer.

Synthesis of the polyether copolymer which comprises a polyether segment containing an epichlorohydrin monomer unit and a hydrophobic polyether segment not containing an epichlorohydrin monomer unit can be carried out by multistage polymerization of an epichlorohydrin monomer and other oxirane monomer by a known polymerization process, as long as a target molecular weight can be attained.

Furthermore, for conversion of at least a part of polyepichlorohydrin monomer units into an oxirane monomer unit having an onium chloride structure by reacting a nitrogen-containing compound with a polyether copolymer which comprises a polyether segment containing an epichlorohydrin monomer unit and a hydrophobic polyether segment not containing an epichlorohydrin monomer unit, any known reaction for onium formation may be applied thereto.

As a particularly favorable method for obtaining the polyether copolymer of the invention, there can be mentioned a method of producing a polyether copolymer, comprising Steps (1) to (3) described below:

(1) a first step of carrying out ring-opening polymerization of oxirane monomers (which may consist of a single kind of monomer or a composition of a plurality of kinds of monomers) containing an epichlorohydrin monomer as at least a part thereof in the presence of a catalyst which comprises an onium salt of a compound containing an atom of Group 15 or 16 in the periodic table and a tri(linear alkyl)aluminum to thereby obtain a polyether segment having an epichlorohydrin monomer unit;

(2) a second step of successively adding, subsequently to the first step, nonionic oxirane monomers (which may consist of a single kind of monomer or a composition of a plurality of kinds of monomers and which may, when required, contain a nonionic oxirane monomer bearing a crosslinkable group) and then carrying out multistage ring-opening polymerization to thereby obtain a polyether copolymer which comprises the polyether segment having an epichlorohydrin monomer unit and a hydrophobic polyether segment; and (3) a third step of causing the polyether copolymer obtained in the second step to react with a nitrogen-containing compound to convert the epichlorohydrin monomer unit to an oxirane monomer unit bearing a cationic group to thereby obtain a polyether copolymer which comprises a polyether segment, containing oxirane monomer units bearing a cationic group, and the hydrophobic polyether segment.

Monomers used in the first step are required to contain an epichlorohydrin monomer as at least a part thereof. There can be mentioned as monomers combinedly used as required with an epichlorohydrin monomers, alkylene oxide monomers (e.g. propylene oxide, 1,2-butylene oxide, 1,2-hexene oxide and the like); oxirane monomers having an aliphatic ring structure (e.g. cyclohexene oxide and the like); aromatic oxirane monomers (e.g. styrene oxide and the like); halogen-containing oxirane monomers (e.g. epifluorohydrin, trifluoromethyloxirane and the like); glycidyl ether monomers (e.g. phenyl glycidyl ether, methoxyethoxyethyl glycidyl ether, vinyl glycidyl ether and the like); and glycidyl ester monomers (e.g. glycidyl methacrylate, glycidyl acrylate and the like); and the like.

An oxirane monomer mixture further containing a small amount of an epichlorohydrin monomer can be used in the above-described second step.

As examples of an onium salt of a compound containing an atom of Group 15 or 16 in the periodic table used as the first component for the catalyst, there can be mentioned ammonium salts, pyridinium salts, imidazolium salts, phosphonium salts, arsonium salts, stibonium salts, oxonium salts, sulfonium salts and selenonium salts.

Among them, ammonium salts, pyridinium salts, imidazolium salts, phosphonium salts and sulfonium salts are favorably used. Further, ammonium salts, phosphonium salts and sulfonium salts are particularly favorably used, and ammonium salts are most favorably used. Among ammonium salts, tetra-n-butylammonium bromide or tetra-n-butylammonium borohydride is particularly favorable.

The amount of an onium salt of a compound containing an atom of Group 15 or 16 in the periodic table to be used may properly be determined according to a molecular weight of the target polyether copolymer, etc., and is not particularly limited. However, a particularly favorable amount of an onium salt used in the method of producing a polyether copolymer of the invention is 0.0005 mol % to 10 mol % relative to total monomers used.

As for tri(linear alkyl)aluminums used as the second component for the catalyst, there can be mentioned, for example, trimethylaluminum, triethylaluminum, and tri-n-octylaluminum. Among them, trimethylaluminum and triethylaluminum are most favorably used.

The ratio of an onium salt of a compound containing an atom of Group 15 or 16 in the periodic table to a tri(linear alkyl) aluminum is not particularly limited. However, a molar ratio of an onium salt:a trialkyl aluminum may be preferably within a range of 1:1 to 1:100, more preferably within a range of 1.0:1.1 to 1.0:50.0, particularly preferably within a range of 1.0:1.2 to 1.0:10.0.

An onium salt of a compound containing an atom of Group 15 or 16 in the periodic table and a tri(linear alkyl) aluminum are generally mixedly used. A method for mixing the two components is not particularly limited. Preferably, however, the components are separately dissolved or suspended in respective solvents, and then, the obtained solutions or suspensions are mixed together. Solvents to be used are not particularly limited. However, favorably used is an inert solvent, for example, an aromatic hydrocarbon such as benzene, toluene or the like; a linear saturated hydrocarbon such as n-pentane, n-hexane or the like; an alicyclic hydrocarbon such as cyclopentane, cyclohexane or the like; an ether such as tetrahydrofuran, anisole, diethyl ether or the like; or a mixed solvent thereof; or the like. The temperature or the time for mixing the two components is not particularly limited. However, the components are preferably mixed for 10 seconds to 30 minutes under a condition of −30° C. to +50° C.

On ring-opening polymerization of an epichlorohydrin monomer in the presence of a catalyst containing the above-described two components, a method for mixing the catalyst and the monomer is not particularly limited. For example, a monomer composition may be added to a solvent containing a catalyst, or a catalyst may be added to a solvent containing a monomer composition.

The polymerization method is not particularly limited. However, in view of good control of the polymerization, the polymerization is preferably carried out by a solution polymerization method. In this case, an inert solvent is favorably used as a solvent therefor, for example, an aromatic hydrocarbon such as benzene, toluene or the like; a linear saturated hydrocarbon such as n-pentane, n-hexane or the like; an alicyclic hydrocarbon such as cyclopentane, cyclohexane or the like; an ether such as tetrahydrofuran, anisole, diethyl ether or the like; or a mixed solvent thereof; or the like. Among them, a nonpolar solvent is particularly favorably used since it accelerates a polymerization reaction rate. The amount of a solvent used is not particularly limited. However, a solvent is preferably used in an amount such that a concentration of a monomer composition is 1% to 50% by weight, particularly preferably 3% to 40% by weight.

Conditions for the polymerization are not particularly limited, and may be determined depending on kinds of monomers and kinds of catalysts used, a target molecular weight, etc. The polymerization pressure is generally 1 to 500 atm, preferably 1 to 100 atm, and particularly preferably 1 to 50 atm. The polymerization temperature is generally −70° C. to +200° C., preferably −40° C. to +150° C., and particularly preferably −20° C. to +100° C. The polymerization time is generally 10 seconds to 100 hours, preferably 20 seconds to 80 hours, and particularly preferably 30 seconds to 50 hours.

The polymerization reaction proceeds with living characteristics in the above-described method of producing a polyether copolymer to allow easy control of the polymerization and consequently, easy production of a polyether copolymer with a desired degree of polymerization.

The second step of the method of producing the polyether copolymer of the invention is a step of successively adding, subsequently to the first step, an oxirane monomer forming a nonionic oxirane monomer unit and then carrying out multistage ring-opening polymerization to generate a hydrophobic polyether segment thereby coupling the hydrophobic polyether segment to the polyether segment containing an epichlorohydrin monomer unit obtained in the first step to thereby obtain a polyether copolymer which comprises the polyether segment comprising the epichlorohydrin monomer unit, and the hydrophobic polyether segment.

Monomers used therein may include, as required, a copolymerizable monomer such as an alkylene oxide monomer having an alkyl group such as ethylene oxide, propylene oxide, 1,2-butylene oxide, 1,2-hexene oxide or the like; an oxirane monomer having an alicyclic structure such as cyclohexene oxide or the like; an aromatic oxirane monomer such as styrene oxide or the like; and a fluorine-containing oxirane monomer such as epifluorohydrin, trifluoromethyl oxirane or the like.

A method for adding a monomer is not particularly limited, and an organic solvent, a tri(linear alkyl)aluminum and the like may be additionally incorporated simultaneously, asneeded.

In the third step of the method of producing the polyether copolymer of the invention, a nitrogen-containing compound is subjected to a reaction (quaternization reaction) with a polyether copolymer, obtained in the second step, comprising a polyether segment containing an epichlorohydrin monomer unit linked to a hydrophobic polyether segment. Thus, a chloro group of an epichlorohydrin monomer unit is converted to an onium chloride structure-containing group to thereby give a polyether copolymer which comprises a polyether segment comprising an oxirane monomer unit having an onium chloride structure-containing group as a cationic group and a hydrophobic polyether segment.

A nitrogen-containing compound used for the quaternization reaction is not particularly limited. There can be mentioned as specific examples thereof an aliphatic amine compound such as ammonia, methylamine, butylamine, cyclohexylamine, aniline, benzylamine, ethanolamine, dimethylamine, diethylamine, dibutylamine, nonylphenylamine, piperidine, trimethylamine, triethylamine, n-butyldimethylamine, n-octyldimethylamine, n-stearyldimethylamine, tributylamine, 1-methylpyrrolidine, aziridine, 1-methylaziridine, 1,4-diazabicyclo[2.2.2]octane and the like; an amine compound having an unsaturated bond such as trivinylamine, N,N'-dimethylaniline and the like; an aliphatic amine compound containing a heteroatom other than a nitrogen atom such as triethanolamine, N,N'-dimethylethanolamine, tri(2-ethoxyethyl)amine and the like; a 5-membered heterocyclic compound such as imidazole, 1-methylimidazole, 1-ethylimidazole, pyrrole, 1-methylpyrrole, thiazole, oxazole, pyrazole, isoxazole and the like; a 6-membered heterocyclic compound such as pyridine, pyrazine, pyrimidine, pyridazine, triazine, 2,6-dimethylpyridine and the like; a condensed heterocyclic compound such as quinoline, isoquinoline, indole, isoindole, benzimidazole, benzoxazole, benzisoxazole, purine, quinoxaline, quinazoline, cinnoline, acridine, and the like; and the like.

A method for mixing a polyether copolymer which comprises a polyether segment containing an epichlorohydrin monomer unit and a hydrophobic polyether segment with a nitrogen-containing compound is not particularly limited. There can be exemplified, for example, a method in which a nitrogen-containing compound is added to and mixed with a solution containing the above-described polyether copolymer; a method in which the above-described polyether copolymer is added to and mixed with a solution containing a nitrogen-containing compound; a method in which a nitrogen-containing compound and the above-described polyether copolymer are separately prepared in solutions, and the two solutions are mixed together; and the like.

An inert solvent is favorably used as a solvent therefor, and the solvent may be nonpolar or polar. Examples of nonpolar solvents include an aromatic hydrocarbon such as benzene, toluene and the like; a linear saturated hydrocarbon such as n-pentane, n-hexane and the like; an alicyclic saturated hydrocarbon such as cyclopentane, cyclohexane and the like; and the like. Examples of polar solvents include an ether such as tetrahydrofuran, anisole, diethyl ether and the like; an ester such as ethyl acetate, ethyl benzoate, and the like; a ketone such as acetone, 2-butanone, acetophenone, and the like; an aprotic polar solvent such as acetonitrile, dimethylformamide, dimethylsulfoxide, and the like; and a protic polar solvent such as ethanol, methanol, water and the like, and the like. A mixture of these solvents can also be favorably used. The used amount of the solvent is not particularly limited. However, the solvent is used in an amount such that the concentration of a polyether copolymer which comprises a polyether segment containing an oxirane monomer unit having an epichlorohydrin unit linked to a hydrophobic polyether segment is preferably 1% to 50% by weight, and more preferably 3% to 40% by weight.

The amount of the nitrogen-containing compound used is not particularly limited, and may be determined depending on the proportion and the like of an oxirane monomer unit having an onium chloride structure in the target polyether copolymer. Specifically, the amount of the nitrogen-containing compound used is generally within a range of 0.01 to 100 mol, preferably 0.02 to 50 mol, more preferably 0.03 to 10 mol, still more preferably 0.05 to 2 mol relative to 1 mol of an epichlorohydrin monomer unit in the polyether copolymer as a raw material.

The pressure when a polyether copolymer, which comprises a polyether segment containing an epichlorohydrin monomer unit and a hydrophobic polyether segment, is caused to react with a nitrogen-containing compound is not particularly limited and is generally 1 to 500 atm, preferably 1 to 100 atm, and particularly preferably 1 to 50 atm. The temperature for the reaction is not particularly limited, either. However, the temperature is generally 0° C. to 200° C., preferably 20° C. to 170° C., and more preferably 40° C. to 150° C. The reaction time is generally 1 minute to 1,000 hours, preferably 3 minutes to 800 hours, more preferably 5 minutes to 500 hours, and still more preferably 30 minutes to 200 hours.

Thus, there can be obtained a polyether copolymer which comprises a polyether segment containing a cationic group-bearing oxirane monomer unit and a hydrophobic polyether segment of the invention.

The polyether copolymer which comprises a polyether segment containing a cationic group-bearing oxirane monomer unit and a hydrophobic polyether segment may be subjected to an anion-exchange reaction to replace a chloride anion in an onium chloride structure with another anion. Such an anion-exchange reaction improves ion conductivity of a resultant polyether copolymer.

The anion-exchange reaction may be carried out in accordance with an ordinary method. Preferably, however, is a method in which a salt of an intended counter anion ($X^-$) (which is contained in a repeating unit represented by general formula (1) contained in the polyether copolymer of the invention) and a metal cation is contacted with the polyether copolymer which comprises a polyether segment containing a cationic group-bearing oxirane monomer unit and a hydrophobic polyether segment to thereby cause them to react with each other.

Specific examples of the salt used include potassium bromide (KBr), potassium iodide (KI), potassium hydroxide (KOH), lithium thiocyanate (LiSCN), lithium bis(trifluoromethanesulfonyl)imide ($Li(CF_3SO_2)_2N$), lithium bis(fluorosulfonyl)imide ($Li(FSO_2)_2N$), lithium tetrafluoroborate ($LiBF_4$), lithium hexafluorophosphate ($LiPF_6$), lithium perchlorate ($LiClO_4$), lithium bis(pentafluoroethanesulfonyl)imide ($Li(CF_3CF_2SO_2)_2N$), lithium methanesulfonate ($LiCH_3SO_3$), lithium trifluoromethyl sulfonate ($LiCF_3SO_3$), lithium trifluoroacetate ($CF_3COOLi$), lithium benzoate (Ph-COOLi), lithium acetate($CH_3COOLi$), lithium butylate ($C_3H_7COOLi$), and the like.

Conditions for the anion-exchange reaction are not particularly limited. The anion exchange reaction can be carried out by mixing only the polyether copolymer, which comprises a polyether segment containing an oxirane monomer unit bearing a cationic group and a hydrophobic polyether segment with a salt, or the anion-exchange reaction may be carried out in the presence of another compound such as an organic solvent. In addition, the amount of the salt used is not particularly limited. However, the amount of the salt is generally within a range of 0.01 to 100 mol, preferably 0.02 to 50 mol, and more preferably 0.03 to 10 mol relative to 1 mol of an onium chloride structure contained in the polyether copolymer which comprises a polyether segment, containing an oxirane monomer unit bearing a cationic group, and a hydrophobic polyether segment.

The pressure during the anion-exchange reaction is generally 1 to 500 atm, preferably 1 to 100 atm, and particularly preferably 1 to 50 atm. The temperature for the reaction is generally −30° C. to 200° C., preferably −15° C. to +180° C., and more preferably 0° C. to +150° C. The reaction time is generally 1 minute to 1,000 hours, preferably 3 minutes to 100 hours, more preferably 5 minutes to 10 hours, and still more preferably 5 minutes to 3 hours.

After completion of the anion-exchange reaction, the target polyether copolymer can be recovered by an ordinary method such as drying under reduced pressure.

The polyether copolymer of the invention may be combined with a porous support to form a composite.

The polyether copolymer of the invention employed in this case may be one not containing a crosslinkable group, because the shape of the polyether copolymer can be retained by the porous support without introducing a crosslinked structure thereinto by jointly using a crosslinking agent described later.

The composite of the invention comprises the polyether copolymer of the invention and a porous support, and preferably has a structure in which a void part of the porous support is filled with the polyether copolymer of the invention.

The porous support used preferably has an open cell structure, a structure (so-called nonwoven fabric-like structure) in which fibers are entangled to form a void part, or a structure (so-called woven fabric-like structure) in which fibers are woven to form a void therebetween.

A material constituting the porous support is not particularly limited, and includes inorganic substances such as glass, ceramics and the like, and polymer materials such as polyethylene, polypropylene, polyimide, polyester, polyamide and the like.

The porosity of the porous support is preferably 20% to 90%, more preferably 30% to 70%.

When the composite is used as a film-like composite, the thickness of the porous support is preferably 1 µm to 1 mm, more preferably 10 µm to 500 µm. When the film is too thin, the film strength tends to decrease. On the other hand, when the film is too thick, it tends to become difficult to fill the polyether copolymer into the voids.

The average pore diameter of a void part is not particularly limited. However, when the average pore diameter is too small, it tends to be difficult to fill the polyether copolymer into the void part. Therefore, it is preferable that the average pore diameter be properly adjusted in accordance with the end use.

A method for combining the polyether copolymer of the invention with a porous support is not particularly limited. However, there can be adopted a method in which the porous support is coated or impregnated with the polyether copolymer of the invention.

The polyether copolymer can be used as a solution where the polyether copolymer is dissolved in an organic solvent, when the number-average molecular weight of the polyether copolymer of the invention is high. An organic solvent used in this case is not particularly limited as long as it dissolves the polyether copolymer of the invention, and includes, for example, toluene, xylene, tetrahydrofuran, dimethylformamide, dimethylsulfoxide, N-methylpyrrolidone and the like.

When an organic solvent is used, it is preferably removed by heat drying, reduced-pressure drying or the like. However, it is preferable that the kind of the organic solvent, drying temperature, drying rate, etc. be properly adjusted for the formation of a structure in which the polyether copolymer of the invention is appropriately filled into a void part of the porous support.

The composite of the invention can be used as an electrolyte film, and can be used particularly as an ion conductive electrolyte film. More specifically, the composite can be used as, for example, a hydroxide ion conductive film for an anion-type fuel cell, a proton conductive film for a proton-type fuel cell, a Li ion conductive film for a lithium ion secondary cell, an anion-exchange film for a brine electrolytic cell and the like. In particular, the composite is particularly favorably used as a hydroxide ion conductive film for an anion-type fuel cell.

When the polyether copolymer of the invention contains a crosslinkable group, it can form an intramolecular and/or intermolecular crosslink.

In addition, the polyether copolymer of the invention can be blended with a crosslinking agent to provide a crosslinkable polyether copolymer composition.

In both cases, waterproof shape-retaining properties of the polyether copolymer composition can be significantly improved by crosslinking.

A crosslinking method may be selected according to kinds and the like of a crosslinkable group in the polyether copolymer, and is not particularly limited. Favorable is a method in which a crosslinking agent capable of crosslinking the crosslinkable groups in the polyether copolymer is blended with the polyether copolymer to provide a crosslinkable polyether copolymer composition, and then, a crosslinking reaction is carried out by actions of the crosslinking agent.

The crosslinking agent used for the crosslinkable polyether copolymer composition of the invention may properly be selected according to the kinds and the like of crosslinkable groups contained in the polyether copolymer. As examples of crosslinking agents used therefor, there can be mentioned, for example, sulfur such as powdered sulfur, precipitated sulfur, colloidal sulfur, insoluble sulfur, highly dispersible sulfur, and the like; sulfur-containing compounds such as sulfur monochloride, sulfur dichloride, morpholine disulfide, alkylphenol disulfide, dibenzothiazyl disulfide, N,N'-dithio-bis(hexahydro-2H-azepin-2one), phosphorus-containing polysulfides, polymer polysulfides, and the like; organic peroxides such as dicumylperoxide, di-tert-butyl peroxide, and the like; quinone dioximes such as p-quinone dioxime, p,p'-dibenzoylquinone dioxime, and the like; organic polyamine compounds such as triethylenetetramine, hexamethylenediamine carbamate, 4,4'-methylene bis(o-chloroaniline), and the like; triazine compounds such as s-triazine-2,4,6-trithiol; alkyl phenol resins having a methylol group; various kinds of ultraviolet crosslinking agents such as alkyl phenone-type photopolymerization initiators, for example, 2-methyl-1-(4-methylthiophenyl)-2-morpholino-propan-1-one, and the like; and the like.

When a crosslinkable group contained in the polyether copolymer is an ethylenically unsaturated carbon-carbon bond-containing group, a crosslinking agent selected from among sulfur, sulfur-containing compounds, organic peroxides and ultraviolet crosslinking agents is preferably used, and an organic peroxide is particularly preferably used among the above-described crosslinking agents. These crosslinking agents may be used solely or in combination.

The proportion of the crosslinking agent blended is not particularly limited but is preferably 0.1 to 10 parts by weight, more preferably 0.2 to 7 parts by weight, and still more preferably 0.3 to 5 parts by weight, relative to 100 parts by weight of the polyether copolymer. When the blended amount of the crosslinking agent is too small, the crosslinking rate may become slower, thus resulting in lower productivity or unsatisfactory physical strength of a crosslinked product. On the other hand, when the blended amount of the crosslinking agent is too large, the resultant crosslinked product may be inferior in performances as an electrolyte.

When sulfur or a sulfur-containing compound is used as a crosslinking agent, a crosslinking-accelerating auxiliary and a crosslinking accelerator are preferably combinedly used therewith. The crosslinking-accelerating auxiliary is not particularly limited, and, for example, zinc white and stearic acid can be mentioned. The crosslinking accelerating auxiliary is not particularly limited, and there can be used, for example, various crosslinking accelerators such as a guanidine-based accelerator; an aldehyde-amine-based accelerator; an aldehyde-ammonia-based accelerator; a thiazole-based accelerator; a sulfenamide-based accelerator; a thiourea-based accelerator; a thiuram-based accelerator; a dithiocarbamate-based accelerator; and the like. These crosslinking-accelerating auxiliaries and crosslinking accelerators can be used solely or combinedly, respectively.

The used amount of the crosslinking-accelerating auxiliary and the crosslinking promoter is not particularly limited, but is preferably 0.01 to 15 parts by weight, more preferably 0.1 to 10 parts by weight, relative to 100 parts by weight of the polyether copolymer.

Other components can be further incorporated into the crosslinkable polyether copolymer composition of the invention. Examples of such components include, not limited to, metal salts such as $LiPF_6$, LiTFSI, KI and the like; low molecular compounds such as water, methanol, ethylene carbonate and the like; an ionic liquid; and fillers such as carbon materials, inorganic materials and the like.

The crosslinkable polyether copolymer composition of the invention has superior processability to such a degree that it can be coated on or impregnated into other material.

The crosslinkable polyether copolymer composition of the invention is crosslinked into a crosslinked product to provide an electrolyte having superior ion conductivity and further superior waterproof shape-retaining properties. That is, the electrolyte of the invention is produced by crosslinking the crosslinkable polyether copolymer composition of the invention.

A method for crosslinking the crosslinkable polyether copolymer composition may be selected depending on the kind and the like of the crosslinking agent used, and is not particularly limited. There can be exemplified crosslinking by heat or ultraviolet irradiation. The temperature for crosslinking by heating is not particularly limited, but is preferably 130° C. to 200° C., more preferably 140° C. to 200° C. The crosslinking time is also not particularly limited and may be selected, for example, within a range of 1 minute to 5 hours. A heating method may appropriately be selected from among press heating, oven heating, steam heating, hot air heating, microwave heating and the like. On crosslinking by ultraviolet irradiation, ultraviolet rays may be irradiated on the crosslinkable polyether copolymer composition in accordance with ordinary methods using a high pressure mercury lamp, a metal halide lamp, a mercury-xenon lamp or the like.

The electrolyte of the invention obtained in the above-described way has superior ion conductivity, and further has superior waterproof shape-retaining properties. Therefore, the electrolyte of the invention can be favorably used for applications of electrochemical devices such as secondary cells, fuel cells, dye-sensitized solar cells, and actuators; and the like.

EXAMPLES

Hereinafter, the invention will be described more specifically by providing examples and comparative examples. In addition, "part(s)" and "%" in examples are based on weight, unless otherwise specified.

Measurements of various properties were carried out in accordance with the following methods.

[Number-Average Molecular Weight (Mn) and Molecular Weight Distribution (Mw/Mn)]

Number-average molecular weight and molecular weight distribution were measured in terms of polystyrene by gel permeation chromatography (GPC) using dimethylformamide as a solvent. HLC-8320 (produced by Tosoh Corporation) was used as a measuring device; two columns of "TSK gel α-M" (produced by Tosoh Corporation) arrayed in series were used; and a differential refractometer "RI-8320" (produced by Tosoh Corporation) was used as a detector.

[Compositional Ratio (Molar Ratio) of Monomer Units of Polymers]

The compositional ratio of monomer units is determined by $^1$H-NMR and elemental analysis.

[Waterproof Shape-Retaining Properties]

Samples are kept still in water at 60° C., and it is judged whether or not the samples are dissolved in water after passage of 24 hours. In a case where a sample is not dissolved in water thereby losing its shape but retains its shape even though swelled, the sample is considered to have superior waterproof shape-retaining properties. A sample is considered that it is not dissolved, if any weight loss is not observed in the sample when it is taken out from water after 24 hours has passed and the water is distilled away from the sample.

[Volume Resistivity]

A coin-type cell is prepared of a sample, and a volume resistivity thereof is measured under a test atmosphere at 25° C. by jointly using an impedance analyzer Type 1260 and a potentiostat Type 1287 (both manufactured by Solartron) as measuring devices. The measurement voltage amplitude is 100 mV, the measurement frequency range is 1 MHz to 0.1 Hz, and an SUS304 electrode is used as a main electrode. When a sample has a lower volume resistivity, it has superior ion conductivity.

Production Example 1

(Production of a Polyether Copolymer of Epichlorohydrin and Propylene Oxide)

0.080 g of tetra-n-butylammonium bromide and 30 mL of toluene were added to a glass reactor equipped with a stirrer, and the mixture was cooled to 0° C. Further, a solution obtained by dissolving 0.0356 g of triethylaluminum in 1 mL of n-hexane was added to the mixture, and the mixture was reacted for 15 minutes.

2.5 g of epichlorohydrin was added to the thus-obtained mixture, and the temperature was raised to 20° C. to carry out a polymerization reaction. After the polymerization reaction was initiated, the viscosity of the solution gradually increased. The solution was reacted for 30 minutes, and then, a portion of the solution was sampled, and the molecular weight of the polymer in the solution was measured. The polymer was found to have a number-average molecular weight (Mn) of 10,200; a weight-average molecular weight (Mw) of 11,100; and a molecular weight distribution (Mw/Mn) of 1.09.

A solution obtained by dissolving 0.021 g of triethylaluminum in 1 mL of n-hexane was further added to the reaction solution, and the solution was reacted for 15 minutes. Then, 5.0 g of propylene oxide was added to the solution, and a second-stage polymerization reaction was carried out. After the polymerization reaction had started, the viscosity of the solution gradually increased further. After the solution was reacted for 30 minutes, a small amount of water was poured to the polymerization reaction solution to terminate the reaction. Then, the solution was dried under reduced pressure at 50° C. for 12 hours.

The yield of the resultant polymer (referred to as "copolymer (OR1)") was 7.5 g. Furthermore, the number-average molecular weight (Mn) of the resultant polymer was 30,800, and the molecular weight distribution (Mw/Mn) thereof was 1.19. In addition, the monomer unit compositional ratio (molar ratio) of the resultant polymer was such that epichlorohydrin monomer units: propylene oxide monomer units=24:76, and confirmed synthesis of poly(epichlorohydrin-block-propylene oxide).

Example 1

(Quaternarization of Epichlorohydrin Units in Copolymer (OR1) with n-Butyldimethylamine)

5.0 g of the copolymer (OR1) obtained in Production Example 1, 10.9 g of n-butyldimethylamine and 10.0 g of acetonitrile were added to an argon-replaced glass reactor equipped with a stirrer, and the mixture was heated to 80° C. After reacted at 80° C. for 96 hours, the mixture was cooled to room temperature to terminate the reaction. The resultant reaction product was dried at 50° C. under reduced pressure for 120 hours to give 10.2 g of an orange solid.

The solid was subjected to $^1$H-NMR measurement and elemental analysis to be identified as poly(3-(chloro-n-butyldimethylammonium)-1,2-epoxypropane-block-propylene oxide) (referred to as "copolymer (A1)") where a chloro group in all epichlorohydrin monomer units in the copolymer (OR1) had been replaced by an n-butyldimethylammonium chloride group while a bromo group of a bromomethyl group at all polymerization-initiative terminals had been replaced by an n-butyldimethylammonium bromide group. In the polyether copolymer, a counter anion for a chloro-n-butyldimethylammonium group is a chloride ion.

The composition of repeating units of the polyether copolymer (A1) is shown in Table 1.

Example 2

(Anion Exchange of Copolymer (A1) with Potassium Hydroxide)

2.5 g of the polyether copolymer (A1) obtained in Example 1, 2.0 g of potassium hydroxide, 20 mL of ion-exchanged water and 20 mL of ethanol were added to a glass reactor equipped with a stirrer. The mixture was reacted at room temperature for 30 minutes, and then, dried at 50° C. under reduced pressure for 1 hour to give a pale purple, oil-like substance. The obtained oil-like substance was dissolved in a mixture solvent of acetone/THF, and, after crystalline undissolved matter was separated, was dried at 50° C. under reduced pressure for 1 hour to give a pale purple, oil-like substance. The obtained oil-like substance was again dissolved in a mixture solvent of acetone/THF, and, after crystalline undissolved matter was separated, was dried at 50° C. under reduced pressure for 12 hours to give 2.2 g of a pale purple, oil-like substance. The obtained oil-like substance was subjected to Fourier transform infrared spectrometric measurement and elemental analysis to be identified as poly(3-(hydroxyl-n-butyldimethylammonium)-1,2-epoxypropane-block-propylene oxide) having a hydroxide ion as a counter anion, where all chloride ions of n-butyldimethylammonium chloride groups in repeating units, and all bromide ions of n-butyldimethylammonium bromide groups at polymerization-initiative terminals in the polyether copolymer (A1) as thestarting material, had been replaced by a hydroxide ion. This copolymer is referred to as copolymer (A2).

The composition of repeating units of polyether copolymer (A2) is shown in Table 1.

Example 3

(Anion Exchange of Copolymer (A1) with Lithium bis (trifluoromethanesulgonyl)imide)

2.5 g of polyether copolymer (A1) obtained in Example 1, 4.1 g of lithium bis(trifluoromethanesulfonyl)imide). 20 mL of ion-exchanged water and 20 mL of ethanol were added to a glass reactor equipped with a stirrer. The mixture was reacted at room temperature for 30 minutes, and then, was dried at 50° C. under reduced pressure for 12 hours. The resultant solid-liquid mixture was washed with water to remove inorganic salts, and then subjected to extraction of the liquid phase with toluene. The resultant toluene solution was dried at 50° C. under reduced pressure for 12 hours to give 3.6 g of a very pale purple viscous liquid substance. The obtained viscous liquid substance was subjected to $^1$H-NMR spectrum measurement and elemental analysis to be identified as poly(3-(bis(trifluoromethanesulfonyl)imide)n-butyldimethylammonium)-1,2-epoxypropane-block-propylene oxide) having a bis(trifluoromethanesulfonyl)imide anion as a counter anion where all chloride ions of n-butyldimethylammonium chloride groups in repeating units, and all bromide ions of n-butyldimethylammonium bromide groups at polymerization-initiative terminals of the polyether copolymer (A1) as the starting material had been replaced by a bis(trifluoromethanesulfonyl)imide anion. This copolymer is referred to as copolymer (A3).

The composition of repeating units of polyether copolymer (A3) is shown in Table 1.

Production Example 2

(Production of a Polyether Copolymer of Epichlorohydrin and Propylene Oxide/Glycidyl Methacrylate)

0.080 g of tetra-n-butylammonium bromide and 30 mL of toluene were added to a glass reactor equipped with a stirrer, and the mixture was cooled to 0° C. Further, a solution obtained by dissolving 0.0356 g of triethylaluminum in 1 mL of n-hexane was added to the mixture, and the mixture was reacted for 15 minutes. 2.5 g of epichlorohydrin was added to the thus-obtained mixture, and the temperature was raised to 20° C. to carry out a polymerization reaction. After the polymerization reaction was initiated, the viscosity of the solution gradually increased. After the solution was reacted for 30 minutes, a portion of the solution was sampled, and the molecular weight of the polymer in the solution was measured. The polymer was found to have a number-average molecular weight (Mn) of 10,200; a weight-average molecular weight (Mw) of 11,100; and a molecular weight distribution (Mw/Mn) of 1.09. A solution obtained by dissolving 0.021 g of triethylaluminum in 1 mL of n-hexane was further added to the reaction solution, and the solution was reacted for 15 minutes. Then, 2.0 g of propylene oxide and 0.5 g of glycidyl methacrylate were added to the mixture, and a second-stage polymerization reaction was carried out. After the polymerization reaction had started, the viscosity of the solution gradually increased further. After the solution was reacted for 30 minutes, a small amount of water was poured to the polymerization reaction solution to terminate the reaction. Then, the solution was dried under reduced pressure at 50° C. for 12 hours. The yield of the resultant polymer was 5.0 g. The resultant polymer was found to have a number-average molecular weight (Mn) of 21,300 and a molecular weight distribution (Mw/Mn) of 1.25. In addition, the monomer unit compositional ratio (molar ratio) obtained by $^1$H-NMR of the polymer was such that epichlorohydrin monomer units: propylene oxide monomer units:glycidyl methacrylate monomer units=42:53:5 (mole: mole: mole), and confirmed synthesis of poly(epichlorohydrin-block-(propylene oxide-ran-glycidyl methacrylate)). This copolymer is referred to as copolymer (OR2).

Example 4

(Quaternarization of Epichlorohydrin Units in Copolymer (OR2) with n-butyldimethylamine)

5.0 g of the copolymer (OR2) obtained in Production Example 2, 10.9 g of n-butyldimethylamine and 10.0 g of acetonitrile were added to an argon-replaced glass reactor equipped with a stirrer, and the mixture was heated to 80° C. After reacted at 80° C. for 96 hours, the mixture was cooled to room temperature to terminate the reaction. The resultant reaction product was dried at 50° C. under reduced pressure for 120 hours to give 7.7 g of an orange solid. The solid was subjected to $^1$H-NMR measurement and the elemental analysis to be identified as poly(3-(chloro-n-butyldimethylammonium)-1,2-epoxypropane-block-(propylene oxide-ran-glycidyl methacrylate), where a chloro group in all epichlorohydrin monomer units in the copolymer (OR2) as the starting material had been replaced by an n-butyldimethylammonium chloride group while a bromo group of bromomethyl groups at all polymerization-initiative terminals had been replaced by an n-butyldimethylammonium bromide group. This copolymer is referred to as copolymer (B1).

The composition of repeating units of the polyether copolymer (B1) is shown in Table 2.

Example 5

(Anion Exchange of Polyether Copolymer (B1) with Potassium Hydroxide)

2.5 g of polyether copolymer (B1) obtained in Example 4, 2.0 g of potassium hydroxide, 20 mL of ion-exchanged water and 20 mL of ethanol were added to a glass reactor equipped with a stirrer. The resultant mixture was reacted at room temperature for 30 minutes, and then, dried at 50° C. under reduced pressure for 1 hour to give a pale purple, oil-like substance. The obtained oil-like substance was dissolved in a mixture solvent of acetone/THF, and, after crystalline undissolved matter was separated, was dried at 50° C. under reduced pressure for 1 hour to give a pale purple, oil-like substance. The obtained oil-like substance was again dissolved in a mixture solvent of acetone/THF, and, after crystalline undissolved matter was separated, was dried at 50° C. under reduced pressure for 12 hours to give 2.1 g of a pale purple, oil-like substance. The obtained oil-like substance was subjected to Fourier transform infrared spectrometric measurement and elemental analysis to be identified as poly(3-(hydroxyl-n-butyldimethylammonium)-1,2-epoxypropane-block-(propylene oxide-ran-glycidyl methacrylate)) having a hydroxide ion as a counter anion, where all chloride ions of n-butyldimethylammonium chloride groups in repeating units, and all bromide ions of n-butyldimethylammonium bromide groups at polymerization-initiative terminals in the polyether copolymer (B1) as the starting material, had been replaced by a hydroxide ion. This copolymer is referred to as copolymer (B2).

The composition of repeating units of polyether copolymer (B2) is shown in Table 2.

Example 6

(Anion Exchange of Copolymer (B1) with Lithium bis (trifluoromethanesulfonyl)imide)

2.5 g of polyether copolymer (B1) obtained in Example 4, 4.1 g of lithium bis(trifluoromethanesulfonyl)imide, 20 mL of ion-exchanged water and 20 mL of ethanol were added to a glass reactor equipped with a stirrer. The mixture was reacted at room temperature for 30 minutes, and then, was dried at 50° C. under reduced pressure for 12 hours. The resultant solid-liquid mixture was washed with water to remove inorganic salts, and then subjected to extraction of the liquid phase with toluene. The resultant toluene solution was dried at 50° C. under reduced pressure for 12 hours to give 3.87 g of a very pale purple viscous liquid substance. The obtained viscous liquid substance was subjected to $^1$H-NMR spectrum measurement and elemental analysis to be identified as poly(3-((bis(trifluoromethanesulfonyl) imide)n-butyldimethylammonium)-1,2-epoxypropane-block-(propylene oxide-ran-glycidyl methacrylate)) having a bis(trifluoromethanesulfonyl)imide anion as a counter anion, where all chloride ions of n-butyldimethylammonium chloride groups in repeating units, and all bromide ions of n-butyldimethylammonium bromide groups at polymerization-initiative terminals of the polyether copolymer (B1) as the starting material had been replaced by a bis(trifluoromethanesulfonyl)imide anion. This copolymer is referred to as copolymer (B3).

The composition of repeating units of polyether copolymer (B3) is shown in Table 2.

Example 7

100 parts of polyether copolymer (A1) obtained in Example 1 and 1,000 parts of dimethylformamide were stirred in an automatic mortar under an atmosphere of an atmospheric temperature of 25° C. and a humidity of 60% for 10 minutes. The resultant solution was homogeneous, pale purple oil-like matter. A polypropylene porous film having a thickness of 25 μm ("Celgard 2400" manufactured by Polypore K.K.) was impregnated with the solution, and the film was vacuum-dried in an oven at 100° C. for 24 hours to distill away the solvent, dimethylformamide to give a composite (A1). The composite (A1) was subjected to the test for waterproof shape-retaining properties to give no ingredients dissolved in water at room temperature and retained the shape of the film. Furthermore, the composite (A1) was incorporated into a coin-type cell under an atmosphere of an atmospheric temperature of 25° C. and a humidity of 60%, and was molded. Volume resistivity of the composite (A1) was measured to be $10^{3.50}$ (Ω/cm). The

Example 8

Preparation of a solution, preparation of a composite (A2), the test for the waterproof shape-retaining properties, and the measurement of volume resistivity were carried out in the same manner as in Example 7 except that the polyether copolymer (A2) obtained in Example 2 was used instead of the polyether copolymer (A1) obtained in Example 1. The constitution, the waterproof shape-retaining properties and the volume resistivity of the composite (A2) are shown in Table 1.

Example 9

Preparation of a solution, preparation of a composite (A3), the test for the waterproof shape-retaining properties, and the measurement of volume resistivity were carried out in the same manner as in Example 7 except that the polyether copolymer (A3) obtained in Example 3 was used instead of the polyether copolymer (A1) obtained in Example 1. The constitution, the waterproof shape-retaining properties and the volume resistivity of the composite (A3) are shown in Table 1.

Example 10

100 parts of polyether copolymers (B1) obtained in Example 4, and 3 parts of dicumyl peroxide as a crosslinking agent ("PERCUMYL D-40" manufactured by NOF CORPORATION) were stirred in an automatic mortar for 10 minutes under an atmosphere of an atmospheric temperature of 25° C. and a humidity of 60%. The resultant crosslinkable polyether copolymer composition was homogeneous, pale purple oil-like matter. The composition was processed into a thin cylindrical product having a diameter of 12 mm and a thickness of 200 μm and was kept in an oven at 40° C. for 1 hour and then, in an oven at 160° C. for 20 minutes to effect a crosslinking reaction. Consequently, the product turned into a rubber-like crosslinked product. This crosslinked product (B1) was subjected to the test for the waterproof shape-retaining properties to retain the shape of the product in water. Furthermore, the crosslinked product was incorporated into a coin-type cell under an atmosphere of an atmospheric temperature of 25° C. and a humidity of 60%, and was molded. Volume resistivity was measured to be $10^{3.10}$ (Ω/cm). The constitution of the crosslinkable polyether copolymer composition, results of the test for the waterproof shape-retaining properties, and the volume resistivity are shown in Table 2. The obtained crosslinked product had sufficient functions as an electrolyte.

Example 11

Preparation of a composition, a crosslinking reaction and preparation of a crosslinked product (B2) were carried out in the same manner as in Example 10 except that the polyether copolymer (B2) obtained in Example 5 was used instead of the polyether copolymer (B1) obtained in Example 4. The constitution of the crosslinkable polyether copolymer composition, results of the test for the waterproof shape-retaining properties, and the volume resistivity are shown in Table 2. The resultant crosslinked product had sufficient functions as an electrolyte.

Example 12

Preparation of a composition, a crosslinking reaction and preparation of a crosslinked product (B3) were carried out in the same manner as in Example 10 except that the polyether copolymer (B3) obtained in Example 6 was used instead of the polyether copolymer (B1) obtained in Example 4. The constitution of the crosslinkable polyether copolymer composition used therein, results of the test for the waterproof shape-retaining properties, and the volume resistivity are shown in Table 2. The resultant crosslinked product had sufficient functions as an electrolyte.

Reference Production Example 1

(Production of an Epichlorohydrin Polymer)

0.080 g of tetra-n-butylammonium bromide and 30 mL of toluene were added to a glass reactor equipped with a stirrer, and the resultant mixture was cooled to 0° C. Further, a solution obtained by dissolving 0.0356 g of triethylaluminum in 1 mL of n-hexane was added to the mixture, and the mixture was reacted for 15 minutes. 2.5 g of epichlorohydrin was added to the thus-obtained mixture, and the temperature was raised to 20° C. to carry out a polymerization reaction. After the polymerization reaction was started, the viscosity of the solution gradually increased. The solution was reacted for 30 minutes, and then, a small amount of water was poured to the polymerization reaction solution to terminate the reaction. Then, the reaction solution was dried at 50° C. under reduced pressure for 12 hours. The resultant polymer has a number-average molecular weight (Mn) of 10,200, a weight-average molecular weight (Mw) of 11,100, and a molecular weight distribution (Mw/Mn) of 1.09. Synthesis of poly(epichlorohydrin) was confirmed by $^1$H-NMR. This copolymer is referred to as copolymer (ORC).

Comparative Example 1

(Quaternarization of Epichlorohydrin Monomer Units in Polymer (ORC) with n-butyldimethylamine)

5.0 g of poly(epichlorohydrin) (polymer (ORC)) obtained in Reference Production Example 1, 10.9 g of n-butyldimethylamine and 10.0 g of acetonitrile were added to an argon-replaced glass reactor equipped with a stirrer, and the mixture was heated to 80° C. After reacted at 80° C. for 96 hours, the mixture was cooled to room temperature to terminate the reaction. The resultant reaction product was dried at 50° C. under reduced pressure for 120 hours to give 10.4 g of an orange solid. The solid was subjected to $^1$H-NMR measurement and elemental analysis to be identified as poly(3-(chloro-n-butyldimethylammonium)-1,2-epoxypropane), where a chloro group in all epichlorohydrin monomer units in polymer (ORC) as the starting material had been replaced by an n-butyldimethylammonium chloride group while a bromo group of a bromomethyl group at all polymerization-initiative terminals had been replaced by an n-butyldimethylammonium bromide group. This polymer is referred to as polymer (C1).

Comparative Example 2

Preparation of a solution, preparation of a composite (C1), the test for the waterproof shape-retaining properties and the measurement of volume resistivity of composite (C1) were carried out in the same manner as in Example 7 except that the polymer (C1) obtained in Comparative Example 1 was used instead of the polyether copolymer (A1). The composition of repeating units of the polymer (C1), the constitution of the composite (C1), results of the test for the waterproof shape-retaining properties and the volume resistivity of the composite (C1) are all shown in Table 1. In addition, when the composite (C1) was kept in water for the test for the waterproof shape-retaining properties, the entire body of the composite was dissolved therein, and thus, the composite (C1) has very poor waterproof shape-retaining properties. No polymer (C1) remained in the sample piece after the test for the waterproof shape-retaining properties, and the volume resistivity was $10^{16}$ (Ω/cm) or more, and thus, the composite (C1) was found to be an insulator.

Reference Production Example 2

(Production of a Propylene Oxide Polymer)

0.080 g of tetra-n-butylammonium bromide and 30 mL of toluene were added to a glass reactor equipped with a stirrer, and the resultant mixture was cooled to 0° C. Further, a solution obtained by dissolving 0.0356 g of triethylaluminum in 1 mL of n-hexane was added to the mixture, and the mixture was reacted for 15 minutes.

5.0 g of propylene oxide was added to the thus-obtained mixture, and the temperature was raised to 20° C. to carry out a polymerization reaction. After the polymerization reaction was started, the viscosity of the solution gradually increased. The solution was reacted for 30 minutes, and then, a small amount of water was poured to the polymerization reaction solution to terminate the reaction. Then, the reaction solution was dried at 50° C. under reduced pressure for 12 hours.

The yield of the resultant polymer (C2) was 5.0 g. The resultant polymer (C2) was found to have a number-average molecular weight (Mn) of 20,700, a weight-average molecular weight (Mw) of 23,300 and a molecular weight distribution (Mw/Mn) of 1.13.

Synthesis of poly(propylene oxide) was confirmed by $^1$H-NMR.

Comparative Example 3

Preparation of a solution, preparation of a composite (C2), the test for the waterproof shape-retaining properties and the measurement of volume resistivity of the composite (C2) were carried out in the same manner as in Example 7 except that the polymer (C2) obtained in Reference Production Example 2 was used instead of the polyether copolymer (A1). The composition of repeating units of polymer (C2), the constitution of the composite, results of the test for the waterproof shape-retaining properties, and the volume resistivity are all shown in Table 2. Though the composite (C2) retained its shape in the test for the waterproof shape-retaining properties, the volume resistivity measurement showed a volume resistivity of $10^{10}$ (Ω/cm) or more, and thus, the composite (C2) was an insulator.

As seen from results shown in Tables 1 and 2, the polyether copolymers of the invention provide electrolytes which have higher waterproof shape-retaining properties and also superior ion conductivity (Examples 7 to 12). Furthermore, the polyether copolymers of the invention have processability superior enough to be impregnated into a porous film before they are crosslinked (Examples 7 to 9) or to be crosslinked with a crosslinking agent (Examples 10 to 12). On the other hand, a polyether copolymer which had a polyether segment containing a cationic group but which did not have any hydrophobic polyether segment was inferior in the waterproof shape-retaining properties (Comparative Example 2). Furthermore, the polyether copolymer which had a hydrophobic polyether segment but had not any polyether segment containing a cationic group was inferior in ion conductivity (Comparative Example 3).

TABLE 1

| | Example 1 | Example 2 | Example 3 | Comparative Example 1 |
|---|---|---|---|---|
| Block Copolymer | (A1) | (A2) | (A3) | (C1) |
| Monomer unit composition (mol %) | | | | |
| Segment containing a cationic group | 24 | 24 | 24 | 100 |
| Repeating units of general formula (1) | 24 | 24 | 24 | 100 |
| Cationic group in repeating units of general formula (1) | BDM(*1) | BDM(*1) | BDM(*1) | BDM(*1) |
| Counter anion species in repeating units of general formula (1) | Cl$^-$ | OH$^-$ | TFMS(*2) | Cl$^-$ |
| Hydrophobic polyether segment | 76 | 76 | 76 | — |
| Propylene oxide units | 76 | 76 | 76 | — |
| Glycidyl methacrylate units | — | — | — | — |

| | Example 7 | Example 8 | Example 9 | Comparative Example 2 |
|---|---|---|---|---|
| Composite | Composite (A1) | Composite (A2) | Composite (A3) | Composite (C1) |
| Block copolymer | (A1) | (A2) | (A3) | (C1) |
| Crosslinking agent | None | None | None | — |
| Porous film | Present | Present | Present | Present |
| Waterproof shape-retaining properties | Superior | Superior | Superior | Inferior |
| Dissolution or No | No dissolution | No dissolution | No dissolution | Entire body dissolved |
| Shape-retained or No | Shape retained | Shape retained | Shape retained | — |
| Volume resistivity values (Ω/cm) | $10^{3.5}$ | $10^{3.4}$ | $10^{4.0}$ | $10^{16}$ |

(*1)n-butyldimethylammonium group
(*2)bis(trifluoromethylsulfonyl) imide anion

TABLE 2

|  | Example 4 | Example 5 | Example 6 |
|---|---|---|---|
| Block Copolymer | (B1) | (B2) | (B3) |
| Monomer unit composition (mol %) | | | |
|   Segment containing a cationic group | 42 | 42 | 42 |
|     Repeating units of general formula (1) | 42 | 42 | 42 |
|     Cationic group in repeating units of general formula (1) | BDM(*1) | BDM(*1) | BDM(*1) |
|     Counter anion species in repeating units of general formula (1) | Cl$^-$ | OH$^-$ | TFMS(*2) |
|   Hydrophobic polyether segment | 58 | 58 | 58 |
|     Propylene oxide units | 53 | 53 | 53 |
|     Glycidyl methacrylate units | 5 | 5 | 5 |

|  | Example 10 | Example 11 | Example 12 | Comparative Example 3 |
|---|---|---|---|---|
| Composite/Crosslinked product | Crosslinked product (B1) | Crosslinked product (B2) | Crosslinked product (B3) | Composite (C2) |
| Block copolymers | (B1) | (B2) | (B3) | (C2) |
| Crosslinking agent | Peroxide | Peroxide | Peroxide | — |
| Porous film | None | None | None | Present |
| Waterproof shape-retaining properties | Superior | Superior | Superior | Superior |
|   Dissolution or No | No dissolution | No dissolution | No dissolution | No dissolution |
|   Shape-retained or No | Shape retained | Shape retained | Shape retained | Shape retained |
| Volume resistivity values (Ω/cm) | $10^{3.1}$ | $10^{3.2}$ | $10^{3.5}$ | $10^{16}$ |

(*1)n-butyldimethylammonium group
(*2)bis(trifluoromethylsulfonyl)imide anion

The invention claimed is:

1. A polyether copolymer comprising:
a polyether segment block containing a cationic group and a hydrophobic polyether segment block, the hydrophobic polyether segment block comprising, as a repeat unit, a nonionic oxirane monomer unit,
wherein the proportion of the nonionic oxirane monomer unit in the hydrophobic polyether segment block is 80 mol % to 100 mol %,
wherein the proportion of the nonionic oxirane monomer unit to total oxirane monomer units constituting the polyether copolymer is 20 mol % to 90 mol %,
wherein the hydrophobic polyether segment block has hydrophobicity as a whole, and
wherein the ratio of the weight-average molecular weight to the number-average molecular weight of the polyether copolymer is 1.0 to 2.0.

2. The polyether copolymer according to claim 1, wherein the polyether segment block containing a cationic group has an oxirane monomer unit represented by General Formula (1)

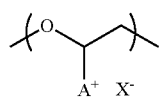

(1)

wherein A$^+$ is a cationic group which has an onium cation structure containing a nitrogen atom, and X$^-$ is an anion.

3. The polyether copolymer according to claim 1, further having an oxirane monomer unit bearing a crosslinkable group.

4. The polyether copolymer according to claim 3, wherein the oxirane monomer unit bearing a crosslinkable group is contained in the hydrophobic polyether segment block.

5. The polyether copolymer according to claim 3, wherein the oxirane monomer unit bearing a crosslinkable group is at least one selected from the group consisting of an allyl glycidyl ether monomer unit, a glycidyl acrylate monomer unit and a glycidyl methacrylate monomer unit.

6. A crosslinkable polyether copolymer composition comprising the polyether copolymer according to claim 3, and a crosslinking agent for the crosslinkable group contained in an oxirane monomer unit in the polyether copolymer.

7. An electrolyte produced by crosslinking the crosslinkable polyether copolymer composition according to claim 6.

8. A composite comprising the polyether copolymer according to claim 1 and a porous support.

9. The composite according to claim 8 which is an electrolyte film.

10. The polyether copolymer according to claim 1, wherein the polyether segment block containing a cationic group comprises a cationic group-bearing repeating unit and wherein the proportion of the cationic group-bearing repeating unit in the polyether segment block containing a cationic group is 30 mol % to 100 mol %.

* * * * *